United States Patent
Conaway et al.

(12) 
(10) Patent No.: US 6,951,248 B2
(45) Date of Patent: Oct. 4, 2005

(54) METHOD OF SEPARATING OIL FROM GEOLOGICAL FORMATIONS

(75) Inventors: Lawrence M. Conaway, Niagara Falls, NY (US); Roger Noble, Tulsa, OK (US); Michael Keller, Tulsa, OK (US); David Caffey, Bixby, OK (US)

(73) Assignee: Continuum Environmental, LLC, Niagara Falls, NY (US)

( * ) Notice: Subject to any disclaimer, the term of this patent is extended or adjusted under 35 U.S.C. 154(b) by 0 days.

(21) Appl. No.: 10/195,096

(22) Filed: Jul. 12, 2002

(65) Prior Publication Data

US 2003/0121658 A1 Jul. 3, 2003

Related U.S. Application Data

(60) Provisional application No. 60/304,899, filed on Jul. 12, 2001.

(51) Int. Cl.[7] ............................................. E21B 43/24
(52) U.S. Cl. ................................. 166/270; 166/272.6
(58) Field of Search .......................... 166/270, 272.6, 166/275, 279, 305.1

(56) References Cited

U.S. PATENT DOCUMENTS

| | | | | | |
|---|---|---|---|---|---|
| 3,757,861 | A | * | 9/1973 | Routson | 166/400 |
| 4,440,651 | A | * | 4/1984 | Weisrock | 507/277 |
| 4,572,292 | A | * | 2/1986 | Stapp | 166/400 |
| 4,687,586 | A | * | 8/1987 | Argabright et al. | 507/225 |
| 4,739,008 | A | * | 4/1988 | Robinson et al. | 524/801 |
| 4,867,238 | A | * | 9/1989 | Bayless et al. | 166/261 |
| 6,251,290 | B1 | * | 6/2001 | Conaway | 210/759 |

* cited by examiner

*Primary Examiner*—William Neuder
(74) *Attorney, Agent, or Firm*—Neal L. Slifkin; Robert C. Brown

(57) ABSTRACT

A method for separating oil from geological formations by application of an aqueous oxidant. The oxidant breaks the interfacial attraction between the oil phase and the geological formation and also produces ketone moieties which assist in separating the oil phase from the mineral phase and also dissolve into the oil phase, thereby decreasing the viscosity. The method is especially useful in recovering heavy oil from geological formations wherein oil has been previously extracted to exhaustion by prior art methods.

6 Claims, 2 Drawing Sheets

METHOD OF SEPARATING OIL FROM GEOLOGICAL FORMATIONS

The present application draws priority from a U.S. Provisional Application, Ser. No. 60/304,899, filed Jul. 12, 2001.

DESCRIPTION

The present invention relates to methods and apparatus for recovering hydrocarbons from geological formations; more particularly, to a method for recovering hydrocarbons from formations wherein oil has been previously extracted to exhaustion by prior art methods; and most particularly, to a method for recovering hydrocarbons from geological formations by injection of an aqueous oxidant under pressure into the formation to cause electrochemical dissociation of the oil phase from the mineral phase.

Conventional production of oil accumulated in geologic reservoirs, using natural pressure found in the reservoirs, typically recovers only about 15% of the oil present. This recovery is known in the art as "primary recovery." It is known to increase the recovery percentage from wells by injecting water or gas under pressure to drive out more oil from the formations, which recovery is known in the art as "secondary recovery." However, it is estimated that even secondary recovery leaves approximately two thirds of the original oil unrecovered; this residual oil is known in the art as "heavy oil." Methodologies employed to recover oil beyond secondary recovery are known in the art as "Enhanced Oil Recovery" (EOR) processes.

Various processes have been disclosed for improving secondary recovery percentages and for extracting heavy oil.

Secondary flooding of geological formations using chemical additives can reduce the interfacial forces binding the oil to mineral substrates, thus freeing more oil for recovery. It is known to use organic polymers to control oil mobility, organic surfactants to reduce capillary forces, or alkaline agents to reduce interfacial tension and wettability between oil/water/substrate surfaces. Although the effectiveness of these techniques may vary from reservoir to reservoir, the effects on the dissociation constants and displacement efficiencies are well known and are standard practice in the industry.

Oil recovery can be enhanced by introduction of pressurized gas which is miscible with the oil and which can thus replace the natural gas originally present, permeating through the oil deposit. One such gas commonly used is carbon dioxide, which is commercially available from industrial processes or from natural deposits such as those found at the McElmo Dome and Sheep Mountain reservoirs in Colorado. This technique typically recovers an additional 7% of the original oil.

Oil recovery can be enhanced by thermal techniques which heat the oil, thus reducing the viscosity in situ and allowing more oil to flow from the rock formations. Steam injection, in situ combustion, electrical/electromagnetic heating, and even nuclear explosive fracturing are known to enhance oil recovery.

All of the known techniques still recover only an additional few percent, as noted above, leaving more than half of the original oil unrecovered and unrecoverable by prior art methods.

What is needed is a method for mobilizing and recovering a substantial additional percentage of oil beyond the amounts recoverable by the prior art.

It is a principal object of the invention to provide an improved process for liberating and mobilizing additional oil from oil deposits exhausted by prior art technology.

It is a further object of the invention to provide an improved process for increasing the volume of known recoverable reserves of oil.

Briefly described, residual heavy oil is released from mineral substrates in geological formations through application of a dilute solution of hydrogen peroxide, formed preferably by combination of sodium peroxide and water during injection into the geological formation. The oil residue is partially oxidized by the peroxide, hydroxyl radicals, and free oxygen, generating heat, carbon dioxide, and low molecular weight hydrocarbons, and especially ketone moieties. Because the amount of peroxide is far less than stoichiometric for complete oxidation of the hydrocarbons, significant amounts of ketones are produced which are soluble in the oil residue. Fragmenting the heavy oil residues, as well as heating them and diluting them with ketones and other low-molecular weight fractionation products, reduces the residue viscosity.

Further, hydrogen peroxide acts as an inorganic surfactant to break the electrostatic association of oil droplets with mineral substrates and water, thus suppressing the capillary forces in pores of the oil reservoir and creating a foam emulsion of hydrocarbons, water, and solids which may be pumped from the reservoir. The foam is treated further with hydrogen peroxide, preferably with addition of a low-molecular weight cutter stock such as pentane or natural gas, to reduce the density of the product and allow for mechanical separation of oil from the water and mineral residues.

The objectives of the subject process are:

a) to recover heavy oil residues from otherwise exhausted oil wells and oil fields;

b) to perform such recovery using much less peroxide than is disclosed in the prior art, to reduce the cost of such recovery; and c) to recover more oil from exhausted oil wells and fields than is possible in the prior art, and therefore d) to increase the known recoverable petroleum reserves of the world.

The foregoing and other objects, features, and advantages of the invention, as well as presently preferred embodiments thereof, will become more apparent from a reading of the following description in connection with the accompanying drawings, in which.

Figure 1:
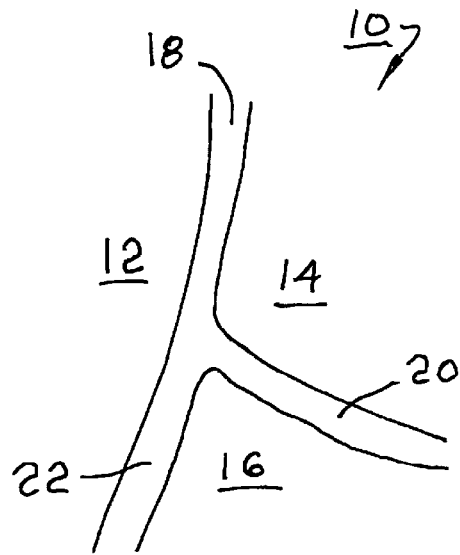
FIG. 1 is a schematic diagram showing the relationships of substrate solid, oil, and water, and the interfaces therebetween, at the microscopic level in a residual oil deposit.

The use of hydrogen peroxide to treat oil/water/mineral colloidal mixtures in order to separate and recover the oil is well known. See U.S. Pat. Nos. 5,797,701; 5,928,522; 6,096,227; and 6,251,290, the relevant disclosures of which are hereby incorporated by reference. Those disclosures deal with treatment of residues in above-ground processes; however, the physical/chemical basis for the success of those processes is applicable to underground in situ oil recovery as well, as described below.

The incorporated references show that, using quite modest concentrations of hydrogen peroxide rather than the massive amounts required in the prior art in accordance with Fenton's reaction, a controlled partial cleavage of hydrocarbon residues may be achieved in which a significant amount of various ketones is produced as expressed by the following generalized equation:

$$H_2O_2 + RCH_3 \rightarrow RC=O + H_2O + \text{heat} \qquad (Eq. 1)$$

wherein R is an aliphatic moiety, $RCH_3$ represents an alkane molecule, and $RC=O$ represents a ketone molecule formed from the alkane molecule. Ketone molecules so produced typically are small enough as to be gaseous or nearly so at atmospheric pressure and are readily soluble in the remaining heavy oil, thus reducing the viscosity of that residue.

In a preferred embodiment of the invention, the oxidizing starting material is sodium peroxide rather than hydrogen peroxide as disclosed in the prior art (see U.S. Pat. No. 4,867,238 issued to Bayless et al.). Sodium peroxide is a solid which may be more readily transported and handled than hydrogen peroxide which, as disclosed by Bayliss, is most conveniently produced at the wellhead, but which therefore requires significant additional onsite apparatus and controls. Ther method of Bayliss et al. further requires controlled injection of both acid and base into the geological formation to control the timing of peroxide decomposition. In the present invention, no acids or additional bases, other than that generated by the hydrolysis of sodium peroxide, are required.

In the preferred embodiment, sodium peroxide and water are mixed and injected into a geological formation retaining heavy oil. The sodium peroxide is hydrolyzed to yield hydrogen peroxide and hydroxyl cations in accordance with the following generalized equation:

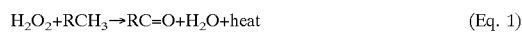

$$Na_2O_2 + 2H_2O \rightarrow 2Na^+ + 2OH^- + 2H_2O_2 \qquad (Eq. 2)$$

The hydroxyl cations produced by dissolution of sodium peroxide additionally enhance the cleavage of hydrocarbons and create a desirably high-pH solution for the partial oxidation of hydrocarbons by hydrogen peroxide.

The prior art method disclosed by Bayliss et al. requires very high concentrations of hydrogen peroxide (between 10 and about 90 weight percent) in order to generate large amounts of carbon dioxide to help mobilize the heavy oil residues, by complete oxidation of a portion of those residues, including the beneficial ketones first produced as intermediaries. In contrast, the present improved recovery method requires only modest amounts of peroxide (between about 0.5 and about 5 weight percent) and preferably does not generate significant amounts of $CO_2$. Rather, the heat generated by dissolution of sodium hydroxide in water combined with the exothermic partial oxidation of hydrocarbons results is a very large increase in temperature within the residues in the formation and thus, in combination with the ketones as just described, reduces significantly the viscosity of the heavy oil and enhances its mobility for extraction.

An extremely important requirement of any recovery method is the ability to break the polar/electrostatic bonds which bind the hydrocarbons to the mineral substrate and thus to reduce the capillary forces which hold the oil residues within the pores of the mineral substrate. While not essential to the present invention, the following description is currently believed to explain the success of the claimed recovery method.

Figure 2:
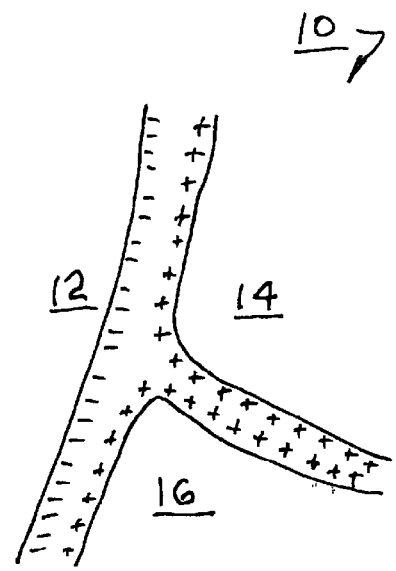
FIG. 2 is a schematic diagram of the capillary forces and Young's equation with respect to the relationships shown in FIG. 1.

Referring to FIGS. 1 and 2, there is shown, at the microscopic pore-size scale, a schematic relationship 10 among the principal three constituents of a hydrated residual oil deposit: mineral substrate 12, which may be clay, sand, or rock such as shale; oil, heavy oil, or hydrocarbons in general 14; and water 16. Interface 18 is between substrate 12 and oil 14; interface 20 is between oil 14 and water 16; and interface 22 is between substrate 12 and water 16. The surface of substrate 12 is inherently electronegative; water is inherently electropositive at its surface, thus it readily wets substrate 12; and oil 14 also is inherently electropositive and thus wets substrate 12. The polar charged microscopic layers between the components are known as "gegenion" layers. The key to breaking the polar bond between the oil and the substrate is to make the water more wettable of the substrate surface than is the oil; thus, the water can displace the oil from the substrate surface, freeing the oil.

Figure 3:
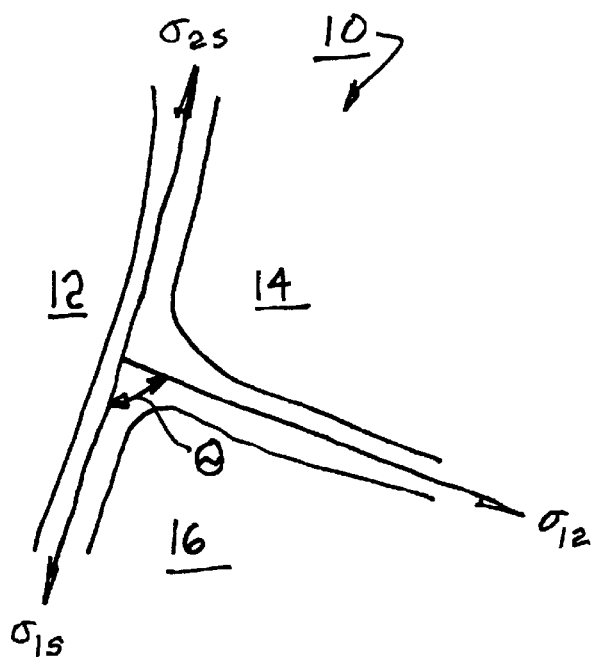
FIG. 3 is a schematic diagram showing the electrostatic relationships in the diagram shown in FIG. 1.

Referring to FIG. 3, the capillary forces in the interface spaces are shown and defined by arrow $\delta_{1S}$ in interface 22; arrow $\delta^{2S}$ in interface 18; and arrow $\delta_{1,2}$ in interface 20, each of which represents the value, per unit length of contact line, of the interfacial tension of its respective interface. The tension forces exerted are perpendicular to the contact lines between the components 12,14,16 and are tangential to the interfaces. The capillary forces are related by Young's equation:

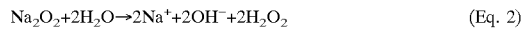

$$\delta_{1S} + \delta_{1,2} \cos\theta = \delta_{2S} \qquad (Eq. 3)$$

We here further define oil bound to the substrate surface as "entrained oil" and oil in contact with the water surface as "free oil." Therefore, an increased ability for water to wet the substrate surface can overcome the capillary force $\delta_{2S}$ and permit water to encroach on and displace oil from such surface, thereby converting entrained oil to free oil which may be recovered along with the water and subsequently separated. Hydrogen peroxide functions as an inorganic surfactant or wetting agent for water, providing the needed increased ability to wet the mineral substrate surface.

Figure 4:
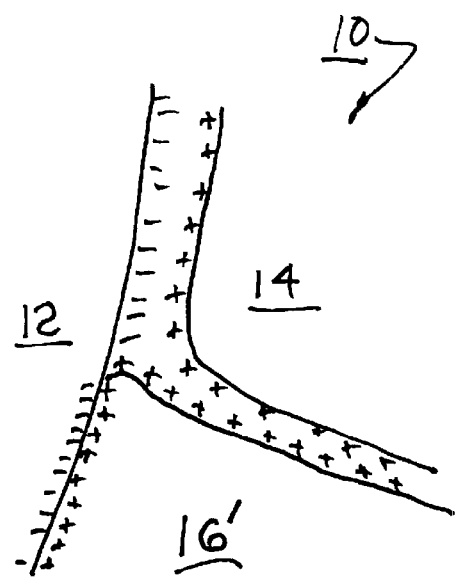
FIG. 4 is a schematic diagram like that shown in FIG. 3, showing the electrostatic surfactant effect of adding hydrogen peroxide to the water.
Figure 5:
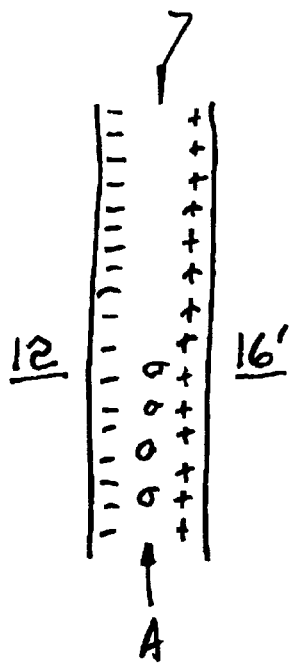
FIG. 5 is a schematic diagram showing the effect on zeta potential A of the decomposition of hydrogen peroxide into water and oxygen anions at the water/substrate interface.
Figure 6:
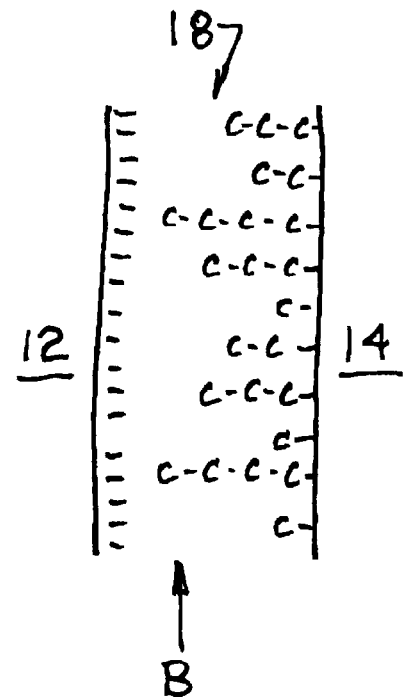
FIG. 6 is a schematic diagram showing an enlarged view of the relationship of alkane molecules in the oil residue to the negatively-charged mineral substrate.

Such wetting is characterized by an enhanced zeta potential of the water/substrate interface 22 when compared to the oil/substrate interface 18. The zeta potential ç is defined as:

$$ç = 4\Pi Qd/D \qquad (Eq. 4)$$

where Q is the charge per unit area, d is the distance into the gegenion layer, and D is the dielectric constant of the layer. Referring to FIG. 4, the enhanced zeta potential of the water 16' including hydrogen peroxide is shown schematically by compression of the gegenion layer between the water and the substrate. Referring to FIGS. 5 and 6, a progressive change and enhancement in zeta potential A along the gegenion layer in the water/solid interface 22 is shown with the progressive effect of $H_2O_2$ addition to the water. No such change is seen in zeta potential B along the gegenion layer in the oil/solid interface 18, as shown in FIG. 5. Thus, water so fortified with hydrogen peroxide 16' is capable of displacing oil from the mineral substrate surface by preferential binding with the substrate, thereby converting entrained oil 14 to free oil 14' (FIG. 7).

Figure 7:
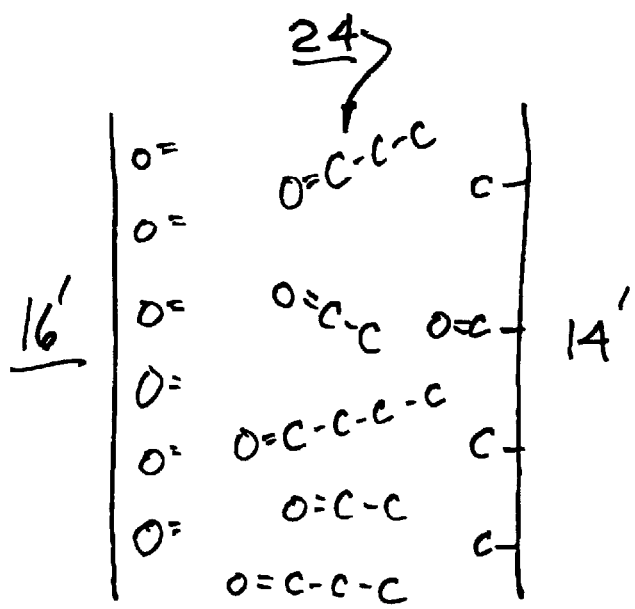
FIG. 7 is a schematic diagram showing the effect of partially oxidizing alkane molecules at the surface of the oil phase to ketones or acids, breaking the colloidal suspension between oil and water.

Referring to FIG. 7, free oil so recovered as by pumping from a geological formation is typically in the form of a metastable foam or froth containing oil, water, and finely divided mineral substrate such as clay and sand, similar to the reaction product experienced in recovering oil from bituminous tar sands in accordance with U.S. Pat. No. 6,251,290, ('290), incorporated by reference hereinabove. The froth is further intensified by low-molecular weight ketones formed in the recovery process which boil out of solution as the pressure is reduced during extraction. This froth can be reduced by the further addition of hydrogen peroxide, as fully disclosed in the '290 patent. Such separation is believed to involve, among other things, the generation of additional ketone moieties 24, as shown in FIG. 7, which serve to make the water and oil more mutually repellant to break down the colloidal stabilization therebetween. The ketones themselves may be conveniently stripped from the reaction mixture and recovered conventionally or reused in a continuous process.

Preferably, the separation process also includes dissolving a low-molecular weight hydrocarbon cutter stock into the oil phase which further reduces the density of the oil phase and aids in separation from the water phase by flotation. The hydrocarbon may be, but is not limited to, an alkane such as methane, ethane, propane, butane, pentane, or combinations thereof. Natural gas makes a convenient cutter in this process. The cutter may be stripped from the separated oil product and recovered in known fashion. The process may be carried out successfully at temperatures as low as 50° C., and in some cases, as low as 20° C. Further, the separation process may be carried out conveniently while the foam or froth is being transported in a slurry pipeline.

From the foregoing description it will be apparent that there has been provided an improved method for recovery of heavy oil from geological formations. Variations and modifications of the herein described method, in accordance with the invention, will undoubtedly suggest themselves to those skilled in this art. Accordingly, the foregoing description should be taken as illustrative and not in a limiting sense.

What is claimed is:

1. A method for recovering oil from a geological formation including a mineral substrate, comprising the steps of:
   a) injecting water and sodium peroxide into said formation;
   b) hydrolyzing said sodium peroxide to hydrogen peroxide and hydroxyl ions;
   c) at least partially releasing said oil from said mineral substrate within said formation by action of said hydrogen peroxide and hydroxyl ions thereupon in an alkaline environment;
   d) partially oxidizing said oil to produce ketones in an interface layer between said oil and said geological formation;
   e) extracting from said geological formation a mixture including said at least partially released oil, said ketones, at least some of said mineral substrate, and water; and
   f) adding hydrogen peroxide to said mixture to further release said oil from said mineral substrate.

2. A method in accordance with claim 1 wherein said further release occurs at least partially in a pipeline.

3. A method in accordance with claim 1 wherein said further release occurs at a temperature between about 20° C. and about 50° C.

4. A method in accordance with claim 1 further comprising the step of separating said released oil from said mineral substrate and said water.

5. A method in accordance with claim 1 wherein said mineral substrate is selected from the group consisting of sand, clay, rock, and shale.

6. A method in accordance with claim 1 wherein said sodium peroxide is provided at a weight percentage to said water between about 0.5 and about 5 percent.

* * * * *